United States Patent Office 3,475,535
Patented Oct. 28, 1969

3,475,535
METHOD OF ANALEPTIC TREATMENT WITH 1,4-ENDOMETHYLENE - $\Delta^5$ - CYCLOHEXENE - 2,3-TRANS - DICARBOXYLIC ACID BIS - DIETHYLAMIDE
Heinrich P. Koch, Vienna, Austria, assignor to F. Joh. Kwizda, Vienna, Austria, a firm
No Drawing. Filed Apr. 1, 1965, Ser. No. 444,821
Claims priority, application Great Britain, Mar. 22, 1965, 12,036/65
Int. Cl. A61k 15/12, 27/00, 15/02
U.S. Cl. 424—180                              3 Claims

ABSTRACT OF THE DISCLOSURE

A method of treating conditions of physical or mental weakness or exhaustion in humans by producing an analeptic effect which comprises administering a pharmaceutical composition containing as its active ingredient 1,4-endomethylene-$\Delta^5$-cyclohexene - 2,3-trans-dicarboxylic acid bis-diethylamide.

---

This invention relates to a novel pharmaceutical composition containing a substituted diamide as an active ingredient and having analeptic properties. The invention relates further to a method of treating conditions of weakness and exhaustion with the aid of the novel composition.

A number of dialkylamides of various aliphatic, aromatic and heterocyclic carbocyclic acids are known for their analeptic activity. A substance which is widely used is "Coramin" (nicotinic acid diethylamide).

It is an object of the invention to provide a novel pharmaceutic composition which has analeptic activity and distinguishes by a high therapeutic activity and a particularly low toxicity.

It is another object of the invention to provide a method of treating conditions of weakness and exhaustion by exerting a strong stimulating activity on the respiration and blood circulation without risk of toxic or other undesired side effects.

The composition according to the invention contains a pharmaceutical carrier and, as an active ingredient, the 1,4-endomethylene-$\Delta^5$-cyclohexene-transdicarboxylic acid bis-diethylamide of the formula:

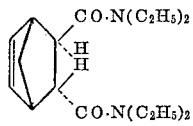

This compound forms colorless, odorless, bitter crystals melting at 84–85° C. It is moderately soluble in water and readily soluble in organic solvents and fatty oils.

The active ingredient has a pronounced analeptic activity. For this reason, it may be used whenever a stimulation of the respiration and of the blood circulation is called for, e.g., as a respiratonic, for geriatric treatment, and as a stimulant in cases of physical and mental exhaustion. The recommended dosage is about 150–300 milligrams per day.

In addition to the active ingredient and suitable carriers, the novel composition may contain other active ingredients which are compatible with the diamide, such as vitamins, alkaloids, other known circulation-controlling substances, etc.

The novel composition may be used in the form of pharmaceutical preparations with organic or inorganic, solid or liquid additives for oral, parenteral or rectal administration.

Suitable additives include all substances which are non-reactive with the diamine, such as water, alcohols, glycols, glycerine and other liquid solvents, sugars, starch, gelatine, talcum, magnesium stearate, solid and liquid fats, particularly vegetable oils, cocoa butter and other suppository substances, and other suitable additives.

The pharmaceutical preparations may be in the form of tablets, dragées, capsulae or pills, solutions, suspensions, emulsions or suppositories.

The solid preparations may be provided with coatings which ensure a controlled delivery of the active ingredients in the alimentary tract.

The liquid preparations may be sterilized or provided with additives for preservation or stabilization, further with solubilizers or emulsifiers and, if desired, with salts for adjusting a predetermined osmotic pressure. All preparations may contain agents for improving the appearance, taste or odor.

The pharmacological activity of the novel product is apparent from the following experiments:

(a) Stimulating activity: The experiments were carried out on albino mice having an average weight of 12 grams. The test animals were fed each with 65 milligrams per kilogram of Nembutal sodium. After 15 minutes the novel substance was administered to the animals in different dosages. The same amount of physiological NaCl solution was injected into the animals of the control group. The mean sleeping time and the range thereof were ascertained. The novel substance resulted in a reduction of the barbiturate-induced sleep by an average of 60% relative to the control group if the dosage was 5–10 milligrams per kilogram.

(b) The acute toxicity was tested on albino mice. The novel substance was injected in an increasing dosage and the test animals were kept under observation for six hours. The nature of the respiration, the occurrence of motor unrest, spasms, lateral attitude and of death were observed. The percentage of the occurrence of said phenomena was determined and used for calculating the values for $ED_{50}$ (107.7 milligrams per kilogram) and $LD_{50}$ (250 milligrams per kilogram).

(c) The subchronical toxicity of the novel substance was tested on dogs. For this purpose, 1 milliliter of a 1% solution was administered daily through five months. An exact blood analysis and a complete urine analysis of the test animals were made at the beginning and end of the test. During the treatment, the weight was continually checked and the behavior of the animals was recorded. Abnormal effects on the blood analysis, urine analysis, weight and behavior of the animals were not observed. At the end of the test, the animals were killed and their organs subjected to a histological examination. This examination too did not reveal any pathological changes.

These tests on animals have conclusively shown that the novel product has a particularly good stimulating activity on the central nervous system and has no detrimental activity at all in therapeutic dosages. For this reason, its medical use as a stimulant appears justified.

The novel analeptic distinguishes by a particularly high therapeutic index from known substances having a similar activity. The test described sub (b) above indicates an $LD_{50}/ED_{50}$ value of about 2.3. In comparison, the corresponding values for the commercially known products "Cardiazol" (pentamethylene tetrazole), "Coramin" (nicotinic acid diethylamide) and "Vandid" (vanillic acid diethylamide) are 1.8, 1.5 and 2.0, respectively. Thus the novel product has in comparison with known products the advantage of being at least equivalent in activity but safer in application.

The invention will now be explained more fully by way of example with reference to the manufacture and administration of dragées, without being limited thereto.

Example 1

50 parts 1,4 - endomethylene-$\Delta^5$-cyclohexene-2,3-trans-dicarboxylic acid-bis-diethylamide, 20 parts lactose and 20 parts starch are uniformly mixed, moistened with a 4% solution of gelatine, and granulated. After the addition of 8 parts talcum and 2 parts magnesium stearate, the granulate was compression-molded to form dragée cores containing 50 milligrams of the active ingredient. The dragée cores were provided with a coating in a usual manner. Three to six dragées per day were administered for a therapeutic treatment.

Example 2

50 milligrams 1,4-endomethylene-$\Delta^5$-cyclohexene-2,3-trans-dicarboxylic acid bis-diethylamide, 5 milligrams vitamin $B_1$, 2 milligrams vitamin $B_2$, 2 milligrams vitamin $B_6$, 40 milligrams vitamin C, 10 milligrams nicotinamide and 1 milligram adenosine were compression-molded with starch, talcum and magnesium stearate in the usual mixing ratio to form dragée cores, which when provided with a suitable coating had a total weight of 200 milligrams. The dragées were tried in a home for aged people for a geriatric treatment of 52 patients, 3 dragées per day being given through an average time of 6 weeks. The results show that the medicament is an excellent tonic, which causes a roborization in the somatic field, promotes the psychic general activity and increases the environmental interest. On the other hand, it does not change the individual blood pressure values, which is particularly important with old patients, which frequently suffer from hypertonicity.

What is claimed is:

1. A method of treating conditions of physical or mental weakness or exhaustion in humans by stimulating respiration and blood circulation which comprises administering to a human in need of such stimulation a pharmaceutical composition containing 1,4-endomethylene-$\Delta^5$-cyclohexene-2,3-trans-dicarboxylic acid bis-diethylamide, in an amount of about 150–300 mg. of said bis-diethylamide per day.

2. A method as defined in claim 1 wherein said pharmaceutical composition further contains, in combination with said bis-diethylamide, vitamin $B_1$, vitamin $B_2$, vitamin $B_6$, vitamin C, nicotinamide and adenosine.

3. A method as defined in claim 2 wherein said composition contains, per 50 mg. of said bis-diethylamide, about 5 mg. of vitamin $B_1$, about 2 mg. of vitamin $B_2$, about 2 mg. of vitamin $B_6$, about 40 mg. of vitamin C, about 10 mg. of nicotinamide and about 1 mg. of adenosine.

References Cited

Koch (II), Monatshefte Chemie, June 24, 1963, pp. 178–182.

ALBERT T. MEYERS, Primary Examiner

J. D. GOLDBERG, Assistant Examiner

U.S. Cl. X.R.

424—252, 255, 263, 266, 280, 320